Aug. 5, 1924.
T. H. WILSON
WATER DISTRIBUTOR
Filed March 22, 1923
1,503,736
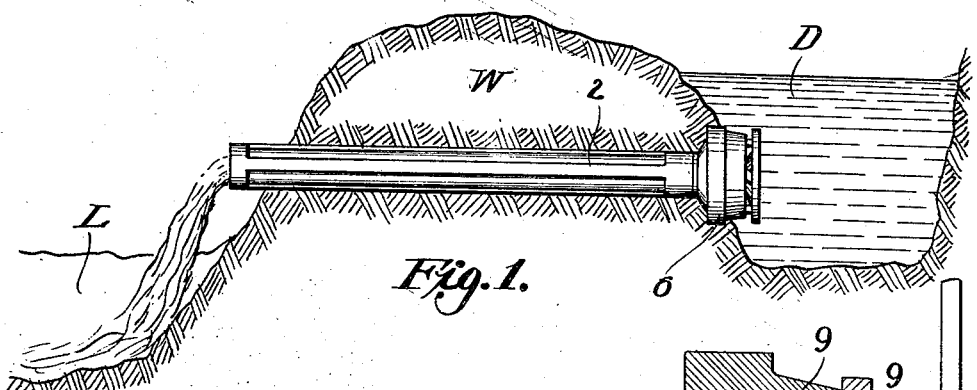
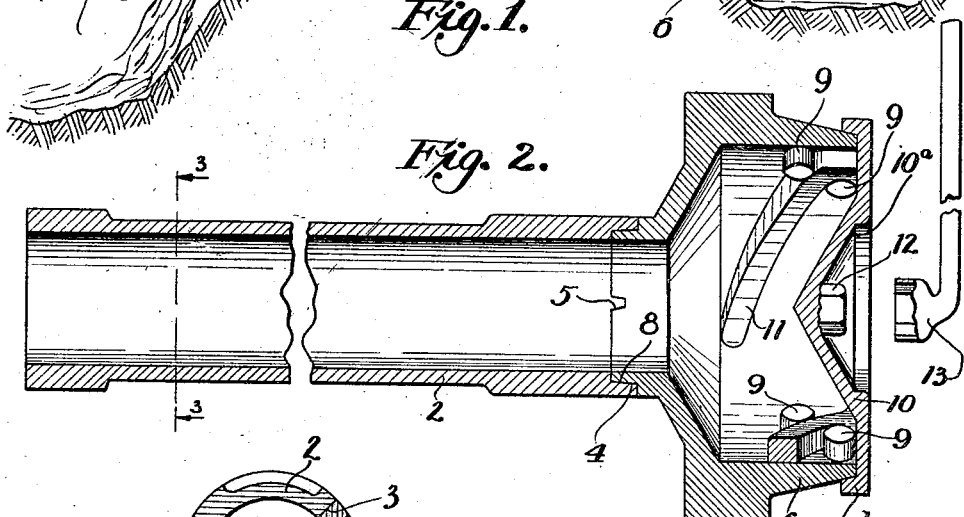
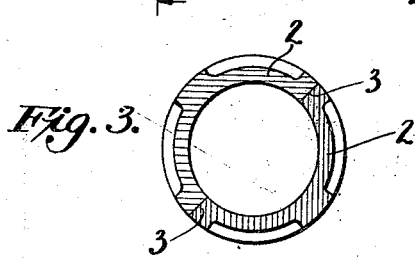
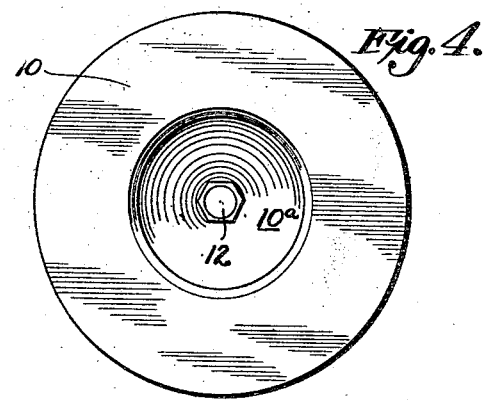
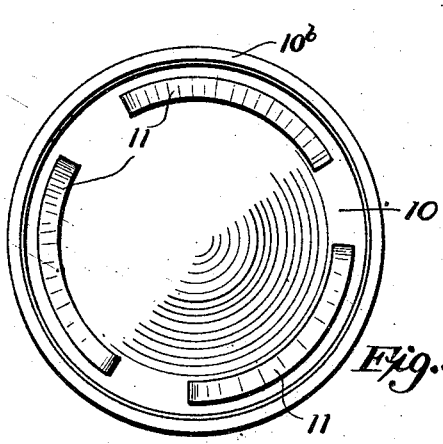
Inventor
Thomas H. Wilson
by Hazard & Miller
Att'ys Patented Aug. 5, 1924.

1,503,736

UNITED STATES PATENT OFFICE.

THOMAS H. WILSON, OF BRAWLEY, CALIFORNIA, ASSIGNOR OF ONE-FOURTEENTH TO W. R. BATLEY, ONE-FOURTEENTH TO ALEX McBURNEY, ONE-FOURTEENTH TO G. A. DAHL, ONE-FOURTEENTH TO E. L. JACK, ONE-FOURTEENTH TO A. N. JACK, ONE-FOURTEENTH TO T. W. NICHOLSON, AND ONE-FOURTEENTH TO PAUL C. SMITH, ALL OF BRAWLEY, CALIFORNIA.

WATER DISTRIBUTOR.

Application filed March 22, 1923. Serial No. 626,792.

*To all whom it may concern:*

Be it known that I, THOMAS H. WILSON, a citizen of the United States, residing at Brawley, in the county of Imperial and State of California, have invented new and useful Improvements in Water Distributors, of which the following is a specification.

This invention relates to regulating valves, and more especially to a type of valved conduit for transferring water from an irrigation ditch or main to a lateral or to a branch of the main. It is an object to provide a regulating valve which may be readily adjusted to increase or decrease the volume of flow through a conduit from one canal or ditch to another. Another object is to provide a combined conduit and valve which may be readily associated and disconnected.

Other objects and advantages will be made manifest in the following specification of an embodiment of the invention illustrated in the accompanying drawings, wherein—

Figure 1 is a diagrammatic, sectional view showing the invention as applied to a main irrigating ditch for serving a lateral.

Fig. 2 is a longitudinal, sectional view of the transfer conduit and the valve, the latter being in closed position.

Fig. 3 is a cross section on line 3—3 of Figure 2.

Fig. 4 is a view of the outside end face of the valve closure.

Fig. 5 is a view of the inside end face of the valve closure.

The device of the present invention comprises what may be termed a distributor, including a tubular section or conduit which may be formed of longitudinal members 2 having meeting, longitudinal edges 3 suitably secured to form the conduit.

This conduit may be of any desired material and size and of any desired cross sectional form, here being shown cylindrical. One end of the conduit 2 is provided with an internal socket or seat 4, and this is provided with a lug 5.

Attachable to the conduit 2 is a head consisting of a shell 6, shown as of cylindrical form and having an end wall 7 provided with a reduced flange 8 adapted to telescope and make a snug joint in the socket 4. The shell 6 is provided with inwardly projecting, guide-forming means here shown as consisting of pairs of lugs or cylindrical studs 9. The studs of each pair are obliquely arranged as to the length of the shell 6 and are suitably spaced from each other for the purpose of receiving parts provided on an adjustable head or closure 10. This head forms an end wall or cap for the shell and is adapted to be moved axially toward and from the shell 6, and therefore to open or close the passage through the shell and to the distributing conduit 2. The valve closure 10 is provided with spirally shaped and inwardly disposed fingers 11, symmetrically arranged on the inner face of the valve member 10, and which form parts cooperating with the guide lugs 9 above mentioned.

The fingers have a snug peripheral working fit with the inner surface of the shell 6, so that when the valve head 10 is adjusted outwardly from the shell, it will remain in this position until readjusted. The valve closure 10 is shown as provided with a marginal flange 10$^b$ inwardly directed, and adapted to close down over the contiguous end shoulder of the shell 6.

The distributor is adapted to be readily mounted as in the earth or other wall W of an irrigating ditch D, from which water is to be supplied to a branch or to laterals L of lower altitude. A feature of the invention is to provide a distributor valve that may be readily opened or closed or adjusted without necessity of the operator's submerging his hands or hand in the water in the ditch, and for this purpose the valve closure 10 is provided with a non-circular device 12, which may consist of a nut-like projection complementary to a socket wrench 13, which may be readily plunged into the water in a ditch and applied to the valve closure and this rotated in either opening or closing movements.

It is desirable to provide a valve structure which enables a number of the structures to be compactly stacked or nested for transportation or storage purposes, and this end is accomplished by providing a concavity 10ª in the outer end surface of the valve closure 10, into which the contiguous projecting hub 8 of an adjacent valve shell may telescope or nest.

Further embodiments, modifications and variations may be resorted to within the principle of the invention.

What is claimed is:

1. A water distributor including a conduit adapted to be implanted in a ditch wall and having a socket end extending into the ditch, a valve shell having an open intake end exposed in the ditch and having a part telescopic in the socket of the conduit, and a valve closure movable axially toward and from the open end of the valve shell to regulate water flow thereinto.

2. In a distributor valve, a shell having a plurality of pairs of guide-forming lugs, and a valve closure adjustable toward and from the contiguous end of the shell, and having spiral fingers engaging respective pairs of lugs and operative to connect the valve closure and the shell and cause the closure to move axially when it is rotated.

3. A distributor comprising a conduit having a socket at its receiving end, a valve shell having an end wall provided with a flange fitting in the socket, the shell being larger than the conduit and circular and having inwardly projecting guide lugs arranged in pairs suitably spaced apart, a valve closure adapted to fit against the end of the shell and having spiral fingers fitting against the inner face of the shell between the pairs of guide lugs and forming a screw connection between the closure and the shell, and means for rotating the closure to regulate the passage of water through the conduit.

4. A distributor comprising a conduit having a socket at its receiving end, a valve shell having an end wall provided with a flange fitting in the socket, the shell being larger than the conduit and circular and having inwardly projecting guide lugs arranged in pairs suitably spaced apart, a valve closure adapted to fit against the end of the shell and having spiral fingers fitting against the inner face of the shell between the pairs of guide lugs and forming a screw connection between the closure and the shell, a wrench seat upon the closure to be engaged by a wrench for rotating the closure to regulate the flow of water through the conduit.

In testimony whereof I have signed my name to this specification.

THOMAS H. WILSON.